(12) United States Patent
Brettschneider et al.

(10) Patent No.: US 11,682,938 B2
(45) Date of Patent: Jun. 20, 2023

(54) STATOR OF AN ELECTRIC MOTOR AND METHOD OF MAKING SAME

(71) Applicant: Bühler Motor GmbH, Nuremberg (DE)

(72) Inventors: Jürgen Brettschneider, Nuremberg (DE); Georg Bonk, Oberasbach (DE); Andreas Appel, Nuremberg (DE)

(73) Assignee: Bühler Motor GmbH, Nuremberg (DE)

( * ) Notice: Subject to any disclaimer, the term of this patent is extended or adjusted under 35 U.S.C. 154(b) by 211 days.

(21) Appl. No.: 16/923,306

(22) Filed: Jul. 8, 2020

(65) Prior Publication Data
US 2021/0013758 A1 Jan. 14, 2021

(30) Foreign Application Priority Data
Jul. 10, 2019 (DE) ..................... 10 2019 210 146.1

(51) Int. Cl.
*H02K 3/28* (2006.01)
*H02K 3/34* (2006.01)
(Continued)

(52) U.S. Cl.
CPC ............... *H02K 3/28* (2013.01); *H02K 3/345* (2013.01); *H02K 3/522* (2013.01);
(Continued)

(58) Field of Classification Search
CPC ........ H02K 3/12; H02K 3/18; H02K 15/0056; H02K 15/0062; H02K 15/0068; H02K 15/0085; H02K 15/0095
See application file for complete search history.

(56) References Cited

U.S. PATENT DOCUMENTS

| 10,686,344 B2 | 6/2020 | Csoti et al. |
| 2011/0068647 A1 | 3/2011 | Sakaue et al. |
| 2015/0076943 A1 | 3/2015 | Hamajima et al. |

FOREIGN PATENT DOCUMENTS

| DE | 10 2014 013 350 A1 | 3/2015 |
| DE | 10 2015 200 086 A1 | 7/2016 |

(Continued)

OTHER PUBLICATIONS

Search Report dated May 27, 2020, issued in counterpart German Patent Application No. 10 2019 210 146.1 (12 pages).

*Primary Examiner* — Ahmed Elnakib
*Assistant Examiner* — Minki Chang
(74) *Attorney, Agent, or Firm* — WHDA, LLP

(57) ABSTRACT

A stator of an electric motor having a stator core with a plurality of salient stator poles, an insulating cap, a stator winding consisting of a winding wire, and an interconnection unit with a plurality of winding-wire receptacles having an inside, wherein the winding wire is surrounded by a material constituting the winding-wire receptacle and connected and welded thereto on the inside. The stator is of an electric motor which is of a very high quality and precision so that high-current applications are possible. Without any major adjustments, the stator is combinable with different winding connections and is flexibly adaptable to the rest of the motor and possibly to the electronics design. The manufacturing method is capable of being flexibly adapted to different wire diameters.

6 Claims, 10 Drawing Sheets

(51) Int. Cl.
*H02K 3/52* (2006.01)
*H02K 15/00* (2006.01)
*H02K 15/085* (2006.01)
*H02K 15/095* (2006.01)

(52) U.S. Cl.
CPC ....... *H02K 15/0068* (2013.01); *H02K 15/085* (2013.01); *H02K 15/095* (2013.01)

(56) References Cited

FOREIGN PATENT DOCUMENTS

| | | |
|---|---|---|
| DE | 10 2015 200 093 A1 | 7/2016 |
| DE | 10 2018 217 857 A1 | 4/2020 |
| EP | 3 442 100 A1 | 2/2019 |
| JP | 2016-13053 A | 1/2016 |
| WO | WO-2018113854 A1 * | 6/2018 ........... H02K 15/095 |

\* cited by examiner

STATOR OF AN ELECTRIC MOTOR AND METHOD OF MAKING SAME

CROSS-REFERENCE TO RELATED APPLICATIONS

The present patent application claims priority from, German Application No. DE 10 2019 210 146.1, filed Jul. 10, 2019, and which is incorporated herein by reference in entirety.

BACKGROUND OF THE INVENTION

(1) Field of the Invention

The invention relates to a stator, in general, and to a stator of an electric motor having a stator core with a plurality of salient stator poles, an insulating cap, a stator winding consisting of a winding wire, and an interconnection means with a plurality of winding-wire receptacles, in particular.

(2) Description of Related Art Including Information Disclosed Under 37 CFR 1.97 and 1.98

US 2019157934 A1 discloses a stator having an interconnection unit. This consists of three differently shaped and angled punched plates with winding-wire receptacles. A bus bar unit according to an embodiment of the '934 invention includes an insulation block and first to fourth bus bars. The first bus bar includes a first connection terminal radially projecting from an insulation block. The second bus bar includes a second connection terminal radially projecting from the insulation block. The third bus bar includes a third connection terminal radially projecting from the insulation block and includes at least one terminal portion that passes between a main body portion of the first bus bar and a main body portion of the second bus bar. The fourth bus bar includes a fourth connection terminal radially projecting from the insulation block and includes at least one terminal portion that passes between the main body portion of the first bus bar and the main body portion of the second bus bar.

BRIEF SUMMARY OF THE INVENTION

An object of the invention is to provide a stator of an electric motor which is of very high quality and precision so that high-current applications are possible. Furthermore, it should be constructed in as radially and axially space-saving and as simply a manner as possible. Without any major adjustments, the stator should be combinable with different winding connections and be flexibly adaptable to the rest of the motor and possibly to the electronics design. The manufacturing method should be capable of being flexibly adapted to different wire diameters.

In the present invention, a winding wire is surrounded by the material of a winding-wire receptacle and connected and welded thereto on the inside, the wire cross-section is maintained and is securely mechanically fastened by the surrounding material of the winding-wire receptacle. In order to obtain the smallest possible axial structure, the interconnection means consists of a contact plate.

It is further provided that the winding wire is completely surrounded by the material of the winding-wire receptacle in the plane of the plate, wherein the winding wire penetrates the plane of the plate through the full plate thickness. The winding-wire receptacle surrounds the winding wire not by mechanical shaping but by a melting process.

In polyphase motors, a plurality of flat plates are provided which are electrically insulated from each other by a likewise flat paper insulation. Instead of a paper insulation, the plates of the interconnection unit can also be varnished or be covered by another flat material that has good insulating properties.

It is further provided that a terminal is provided for each interconnection unit. This can simply be butt-welded to a plate plane of the interconnection unit. Laser welding is suitable for this because the laser beam can be guided very accurately and can be metered. The terminal should have a cylindrical shape. This allows much simpler and more reliable grommets to be realized, as required in many applications. If the requirements are less stringent, a partial region can also be angled out from the plate material to act as a connecting unit.

It has proven expedient to mount the interconnection unit on a carrier unit. This makes it possible to form a compact and more easily adjustable assembly. This assembly can be adapted to the shape of the insulating cap by means of projections or recesses.

When a plurality of interconnection units are used, these can be of identical or different design. The winding wire and the interconnection unit expediently consist of the same material, in particular copper.

The object of the invention is further achieved by a method having the following features:

a) Providing a stator core, an insulating cap, an end cap, a winding wire, a carrier unit and an interconnection unit or an interconnection unit with an integrated carrier unit and interconnection unit, a winding device and a laser welding device;

b) Mounting the insulating cap and the end cap on in each case an axial end region of the stator core;

c) Winding a stator pole of the stator with the winding wire, wherein the winding wire is guided between two poles having a radial component beyond the diameter of the stator core and around a projecting arm and guided radially inwards angularly offset from a stator pole that is to be wound next while forming a conductor loop;

d) Stripping winding wire regions of the conductor loop while holding in position and maintaining free accessibility by the projecting arm;

e) Positionally correct mounting of the carrier unit and of the interconnection unit or of the interconnection unit with integrated carrier unit and interconnection unit, wherein the angular position of the winding-wire receptacles corresponds to the angular positions of the outwardly or inwardly running winding wire;

e) Stripping winding wire regions of the conductor loop;

f) Bending the conductor loop radially inwardly with the aid of carrier unit until the winding wire regions of the conductor loops engage in winding-wire receptacles of the interconnection units that are bounded by contact fingers;

g) Heating the contact fingers on both sides of the winding-wire receptacle before, after or during the cutting of the conductor loop by means of a laser beam until, the contact fingers melting and the melted material internally connects with and welds to the winding wire;

h) Prior or subsequent removal of one or more projecting arms either simultaneously or sequentially or of the auxiliary unit for temporarily supporting the conductor loop; and i) Mounting further components or assemblies.

One or more interconnection units can be mounted on a carrier unit, wherein the carrier unit has already been mounted on the insulating cap. Alternatively, one or more interconnection units can be pre-assembled with a carrier unit to form an assembly. The carrier unit is required in order to present bending edges for a defined bending of the conductor loops.

While the insulating varnish is being stripped off, a laser beam is preferably scanned over the winding wire region to be stripped. Here either the laser beam is turned or the stator is moved correspondingly.

The projecting arms are provided as integral components of the insulating cap and serve to temporarily fix in place the conductor loops which are under tensile stress. The fixation is necessary in order to ensure adequate process reliability for the following method steps.

In an essential feature of the invention, the clamping fingers in particular are heated by the laser beam, causing them to partially melt. However, the winding wire is also heated by the laser beam, but with lower intensity. As a result, there is no risk of cross-sectional loss due to the welding. The originally radially open winding-wire receptacle is closed after the welding process and the winding wire is surrounded by the melted material which was obtained from the material of the contact fingers. During welding, the laser beam is directed alternately onto the two contact fingers and also briefly onto the winding wire. As a result, the regions to be melted are heated uniformly. This leads to a high-quality welded connection.

Because of the placement of wire sections radially outwards, the interconnection unit can be inserted easily and without laborious threading after the stator has been wound. Grooves in the insulating cap prevent an unfavorable displacement of the sections of the winding wire that are to be welded. Furthermore, the carrier unit can be reliably aligned by means of matching projections or recesses.

For the purpose of saving installation space, it is advisable to remove the conductor loop after the welding. When using a pulsed laser, the conductor loops can also be removed with the aid of the laser beam. Alternatively, the conductor loops can be cut off easily with a cutting tool.

In order to ensure the high quality of the welded connection, it is provided that the conductor loop is held radially inside and touching the winding-wire receptacle during the welding process. This always results in the same conditions and therefore a consistently high welding quality.

The interconnection unit can be electrically insulated from each other by an insulating layer. This insulating layer can be firmly connected to the interconnection means or can be placed loosely between two interconnection units. In the latter case, insulating rings must additionally be provided which, after the mounting of the first interconnection unit, are then stacked on top of each other, alternating with further interconnection units.

Alternatively, the carrier unit and a plurality of interconnection units can also be pre-assembled to form an assembly and be mounted as such. For this purpose, the carrier unit and a plurality of interconnection units can be encapsulated with insulating plastic material in an injection-molding machine as inserts. Additional insulation is not required, provided the individual interconnection means are kept a short distance apart in the injection mold.

However, the carrier unit does not necessarily have to be pre-assembled and joined to the one or more interconnection units as an insert, but rather can also be formed during the encapsulation of the one or more interconnection units.

The stator can be designed for all interconnection types. The invention is not limited to one-piece stators, but also includes pole chains or single poles.

BRIEF DESCRIPTION OF THE SEVERAL VIEWS OF THE DRAWINGS

The exemplary embodiments of the invention are explained in more detail below based on the drawing. The following is shown.

DETAILED DESCRIPTION OF THE INVENTION

Figure 1:
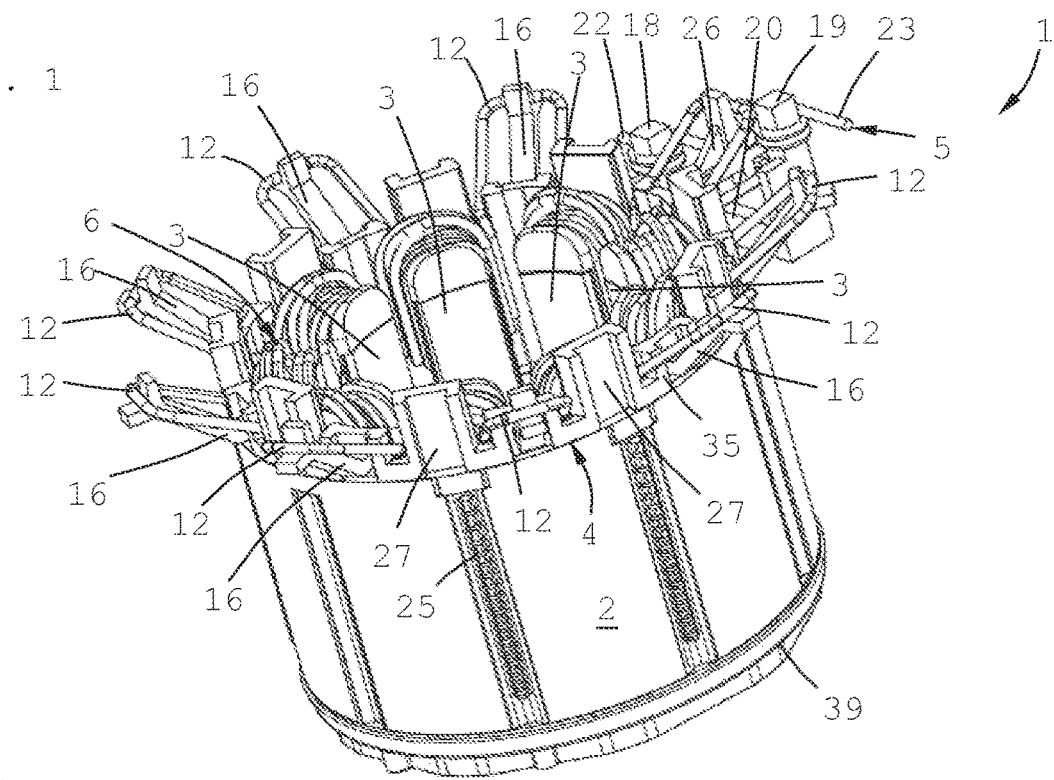
FIG. 1 is a perspective view of a stator after winding.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a perspective view of a stator 1 of an electric motor with a stator core 2, an insulating cap 4 and an end cap 39 after the winding of a plurality of stator poles 3 with a winding wire 5 for forming stator coils of a stator winding 6. Projecting arms 16 extend obliquely outward from the insulating cap 4, with axially and radially outwardly guided conductor loops 12 which represent a wire connection between adjacent coils of the stator winding 6 resting on the projecting arms 16. A winding start 22 is laid around a starting peg 18 and guided to a stator pole 3 via an additional projecting arm 26. After the winding of all stator poles 3, a winding end 23 is laid around an end peg 19 and cut off. The starting peg 18 and the end peg 19 form one piece with a cross-member 20, an additional projecting arm 26 and the insulating cap 4. Axially projecting guide 27 can also be seen, which are arranged in the angular segment of the stator poles 3. These form a lateral guide for the conductor loops 12 during the manufacturing process.

Figure 2:
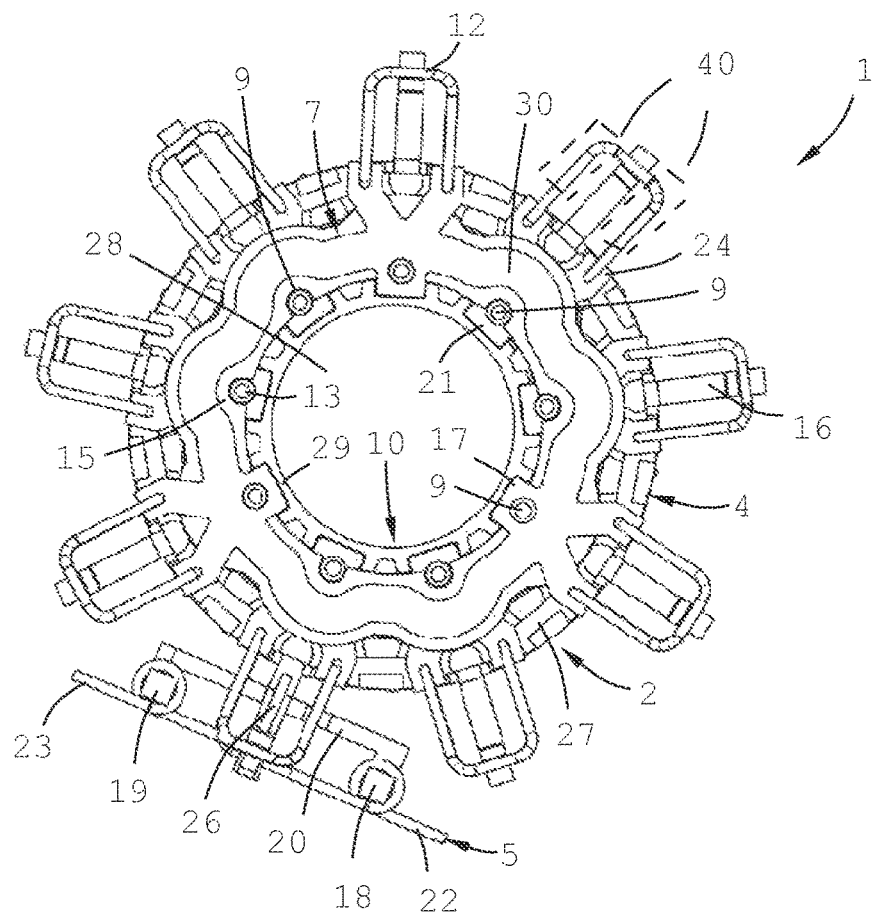
FIG. 2 is a plan view of the stator with an interconnection means before an interconnection operation, FIGS. 3 A and B are side views of the stator with the interconnection units before the interconnection operation.

FIG. 2 shows a plan view of the stator with an interconnection unit 7 before an interconnection operation, with the stator core 2, the insulating cap 4, a carrier unit 10 and conductor loops 12 of the stator winding. The insulating cap 4 comprises the guide 27, the projecting arms 16, the cross-member 20, the starting peg 18 and the end peg 19. The guide 27 are arranged in the angular region of the stator poles and guide the carrier unit 10 during its mounting and align it with respect to the stator poles. The carrier unit 10 comprises a central recess 28 which is externally bounded by a stiffening ring 29. The stiffening ring 29 bounds recesses 21 into which retaining tongues 17 of the interconnection unit 7 engage. A positionally correct mounting on the carrier unit 10 is thereby achieved. Each interconnection unit 7 is connected to a terminal 9 and connected to the carrier unit 10 by means of retaining pins 13. Each interconnection unit 7 has a bus ring 30 provided with indentations 15 for retaining pins 13 or terminal 9. The interconnection units 7 each have three pairs of radially outwardly extending furciform contact fingers 24 which terminate as contact forks with winding-wire receptacles 8 open to the outside. Also shown are the additional projecting arm 26, the winding wire 5, the winding wire region 40, the winding start 22 and the winding end 23.

Figure 3:
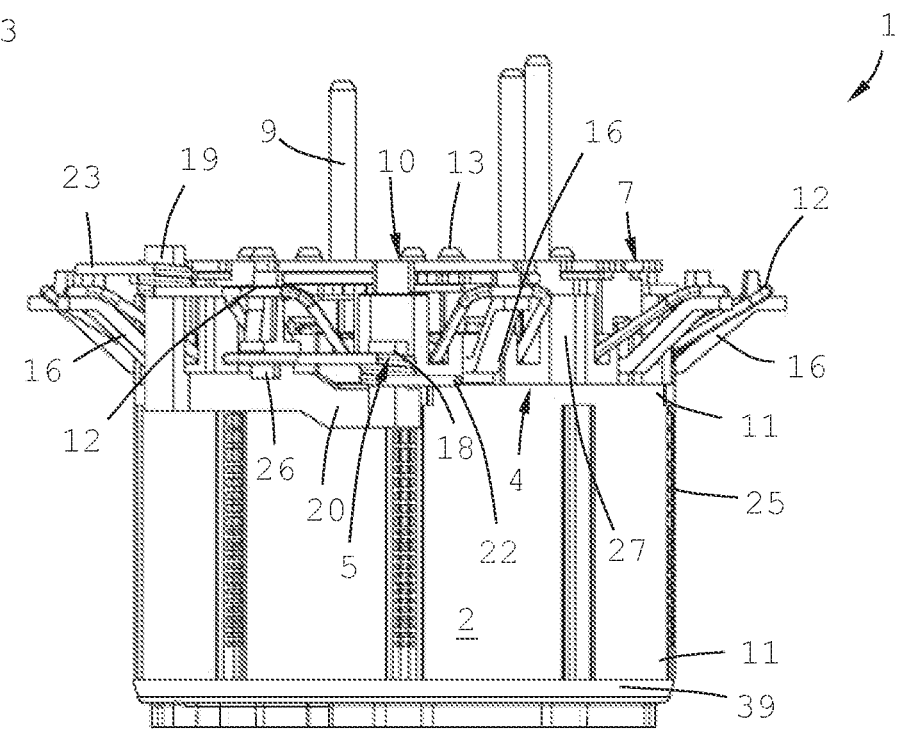
Figure 3:
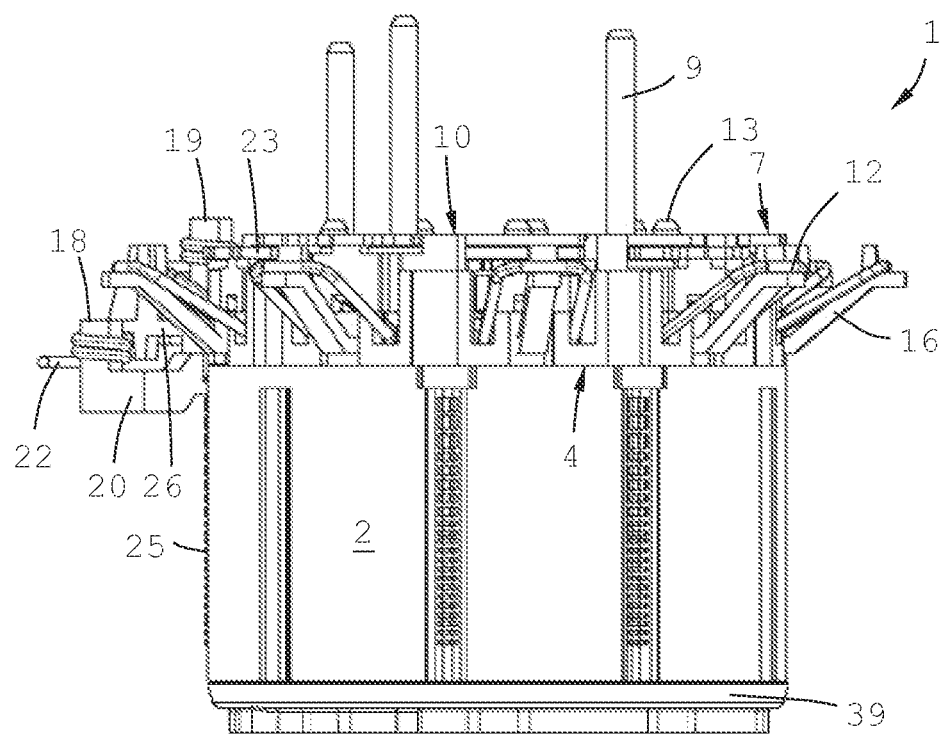

FIGS. 3 A and B show two side views of the wound stator 1 with the interconnection unit 7 with the conductor loops 12 of the stator winding 6 guided radially and axially outwards. The conductor loops 12 rest on the projecting arms 16, which are of one piece with an insulating cap 4. The winding start 22 of the stator winding is wound several times around the starting peg 18. The winding wire 4 of the stator winding is wound from the starting peg 18 around a stator pole 3, then around a projecting arm 16, and around a further stator pole, and so on. The winding end 23 is wound around the end peg 19 several times. The starting peg 18 and the end peg 19 are of one piece with the additional projecting arm 26 via the cross-member 20. For technical reasons relating to the winding, the winding start 22 and the winding end (see FIG. 2) are connected to the starting peg 18 and the end peg 19, respectively, on different planes.

Three interconnection units 7 embodied as simple plate sections are mounted on the carrier unit 10 by means of retaining pins 13 and insulated from each other by insulating rings 41. The retaining pins 13 are of one piece with the carrier unit 10. The carrier unit 10 is made of an electrically insulating material and is produced by means of a plastic injection-molding process. The assembly consisting of carrier unit 10 and a plurality of interconnection units 7 is mounted on the insulating cap 4. The insulating cap 4. the carrier unit 10 and the interconnection units 7 have interlocking geometries by means of which a positionally correct arrangement is possible, the furciform contact fingers 24 (see FIG. 2) of the interconnection unit 7 corresponding to the winding wire routing and the angular position of the stator poles 3. The insulating cap 4 is mounted on the end region 11 of a stator core 2 which consists of a punched laminated core. The stator core 2 has clamping fingers 25 on its circumference, with the aid of which the stator 1 can engage in a motor housing free of clearance. The stator winding can be connected to a printed circuit board via the terminal 9. A terminal 9 is assigned to each interconnection unit 7. A terminal and an interconnection unit 7 are mechanically connected to each other by laser welding. Guide structure 27 that are of one piece with the insulating cap 4 and the end cap 39 are also shown.

Figure 4:
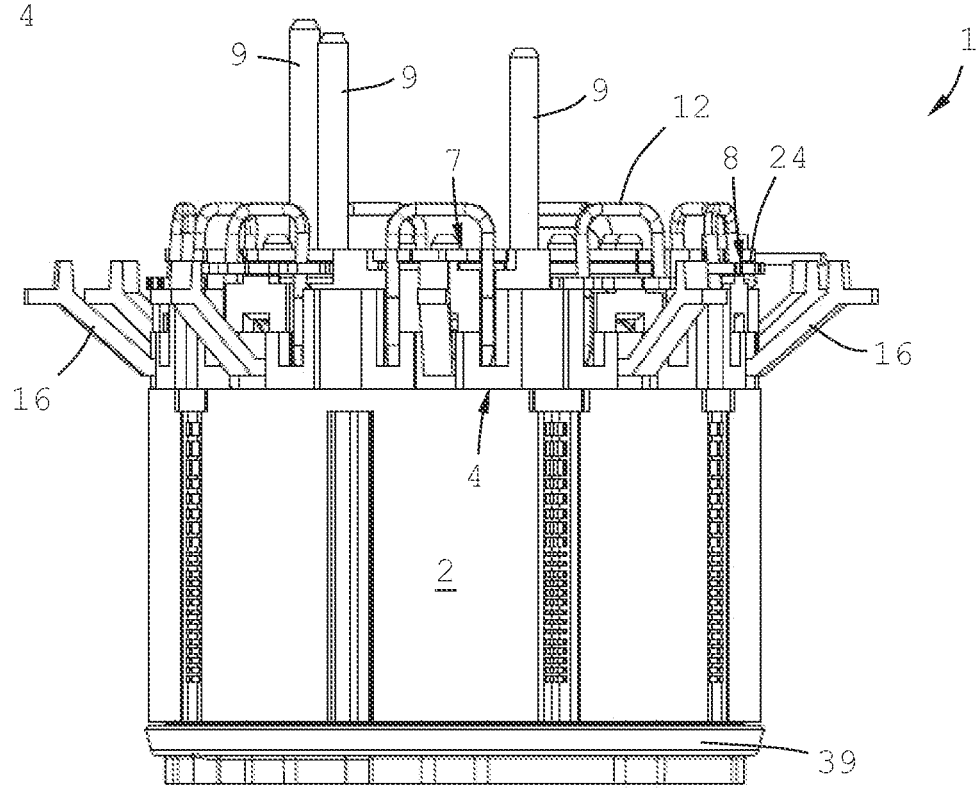
FIG. 4 is a side view of the stator after a forming operation.

FIG. 4 shows a side view of the stator 1 after a forming operation, with the stator 2, the insulating cap 4, the end cap 39, interconnection units 7, conductor loops 12, projecting arms 16 and terminals 9. After the forming operation, the conductor loops 12 are inserted into winding-wire receptacles 8 in the interconnection units 7 which are bounded by furciform contact fingers 24. The projecting arms 16 now no longer have any function and can be removed.

Figure 5:
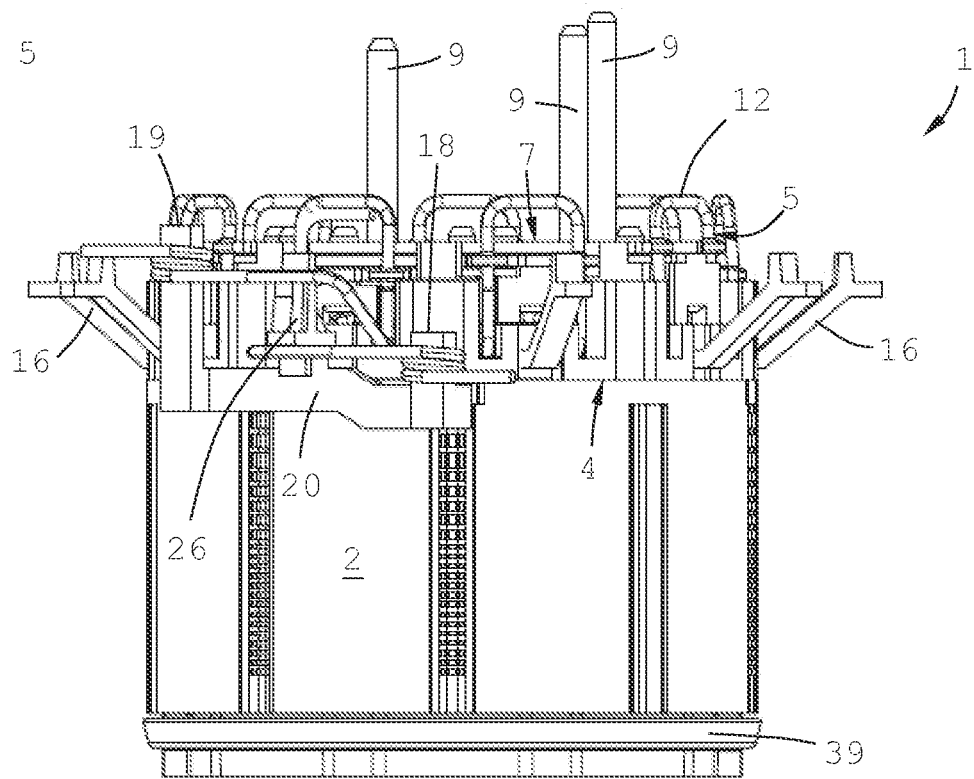
FIG. 5 is a side view of the stator after a welding operation, FIGS. 6 A and B are side and a top views of the interconnection unit, FIGS. 7 A and B are plan and a side views of a carrier unit.

FIG. 5 shows a side view of the stator 1 after a welding operation in which the contact fingers 24 (see FIG. 4) were heated by a laser beam until melted. The excess material of two adjacent contact fingers 24 in each case here has closed to form a ring and is joined to the winding wire 5. Before welding, a varnish insulation of the winding wire 5 was removed. The stripping can be done mechanically or by means of a laser beam.

Figure 6:
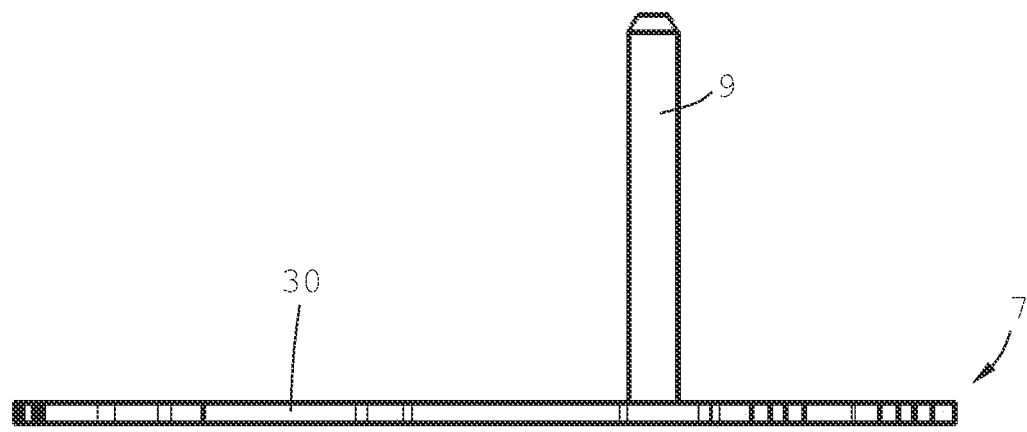
Figure 6:
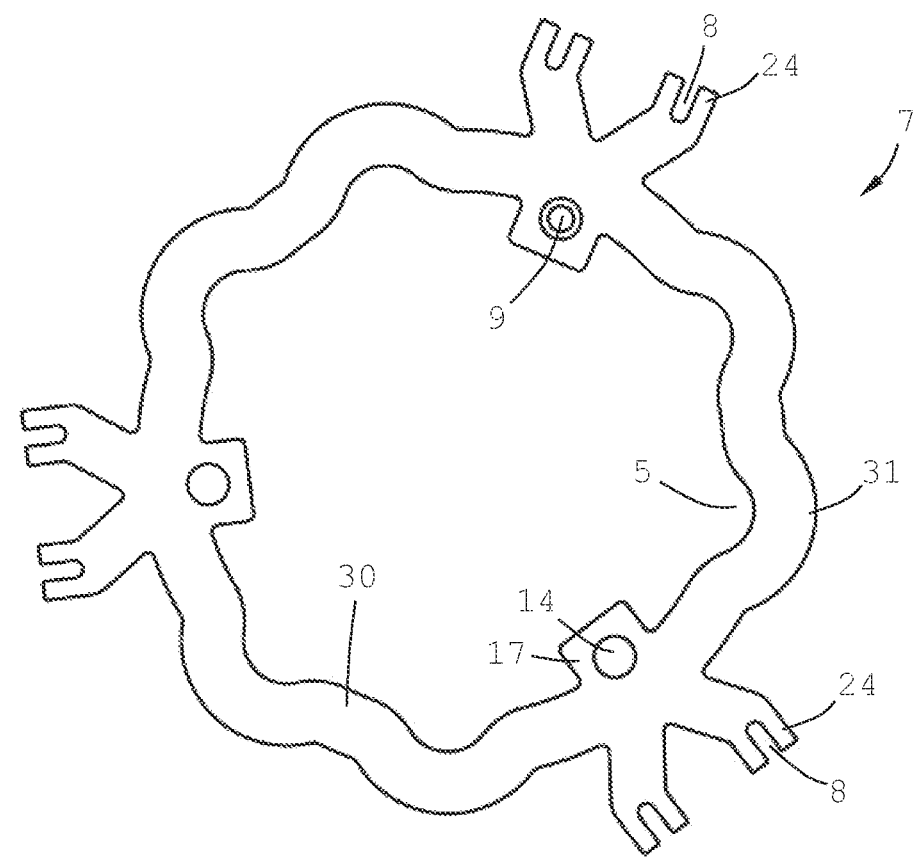

FIGS. 6 A and B show a side view and a top view of an interconnection units 7. As can be clearly seen, the interconnection unit 7 consists only of a flat plate section, without bent parts or parts bent at right angles. A plurality of interconnection units 7 can thereby be mounted one after the other in a very space-saving manner. Each interconnection unit 7 is welded to a terminal 9.

The interconnection units 7 have the form of a sinuous bus ring 30, three inwardly directed retaining tongues 17 provided with a hole 14, indentations 15 and three radially outwardly directed contact fingers 24 with winding-wire receptacles 8. The winding-wire receptacles 8 are designed such that at least two winding wires can be accommodated therein. The unused portion serves as melting material during welding. The contact fingers are of one piece with the bus ring 30 via V-shaped contours. The interconnection unit 7 is made of copper. The bus ring 30 largely retains its cross-section over its circumference. At those locations with indentations 15 on the inside, corresponding bulges 31 are present on the outside.

Figure 7:
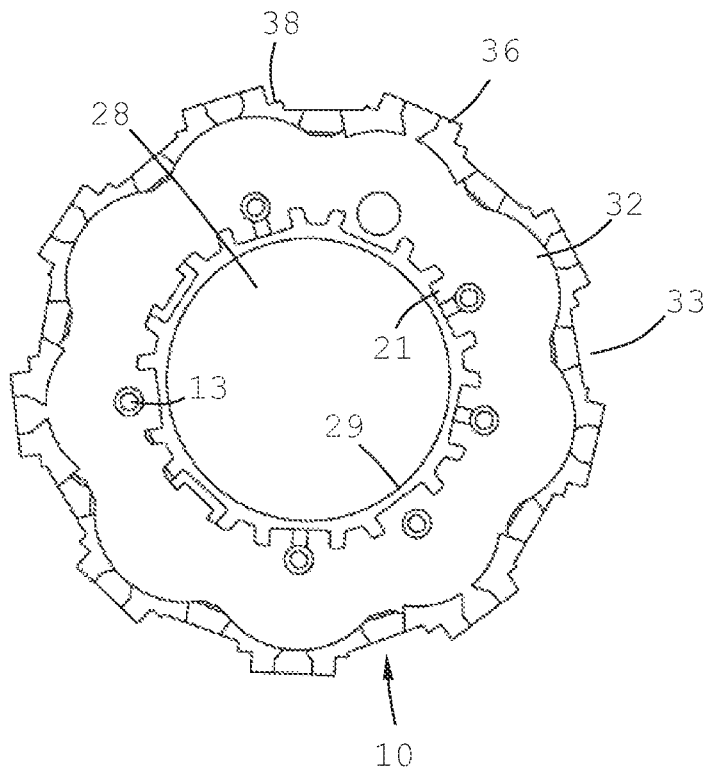
Figure 7:
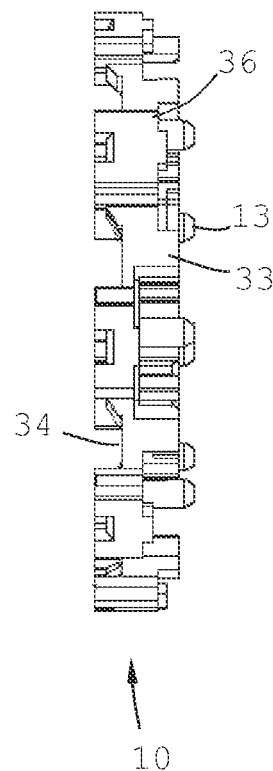

FIGS. 7 A and B show a top view and a side view of the carrier unite 10, with a central recess 28, a stiffening ring 29 bounding this on the outside, retaining pins 13, recesses 21 and outwardly open radial recesses 33 for receiving guide 27 of the insulating cap 4 (see FIG. 2). The regions between the recesses 33 serve as spacers 36 for the conductor loops. Bending edges 38, which assist a back-bending operation of the conductor loops during manufacturing, adjoin the recesses 33.

Figure 8:
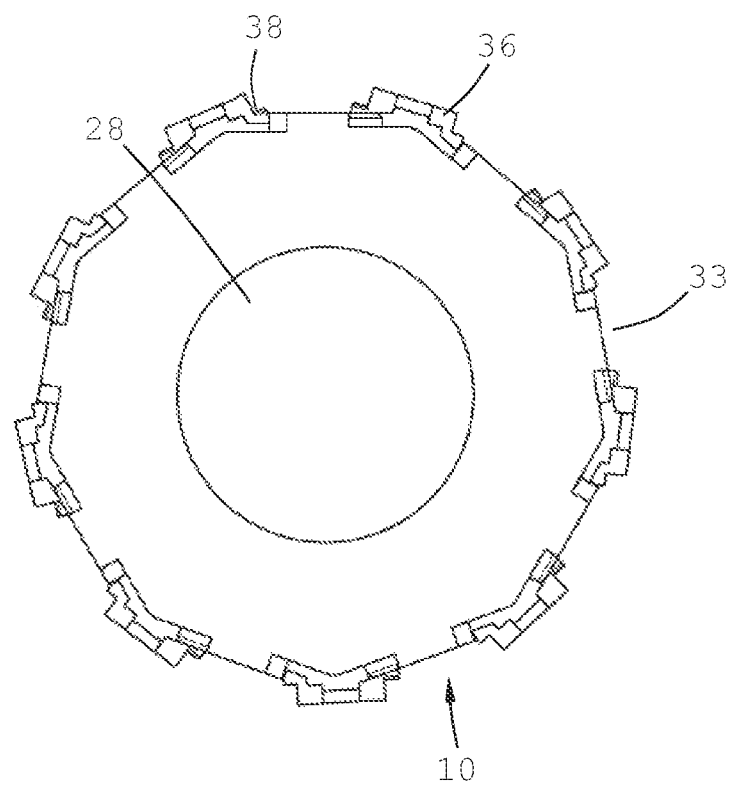
FIG. 8 is a bottom view of the carrier means.

FIG. 8 shows a bottom view of the carrier structure 10, with the central recess 28, the radial recesses 33, the bending edges 38 and the spacers 36.

Figure 9:
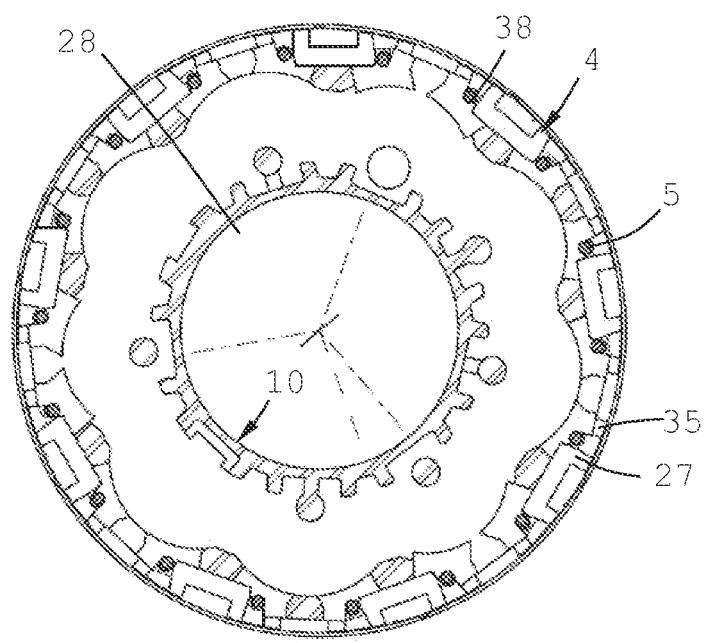
FIG. 9 is a sectional view of the carrier means with winding wire.

FIG. 9 shows a sectional view of the carrier unit 10 mounted on the insulating cap 4 and inserted winding wire 5 bearing against the bending edges 38 of the carrier unit 10. The insulating cap 4 has guide 27 and guide contours 35 which serve as a lateral support and guide for the winding wire 5.

Figure 10:
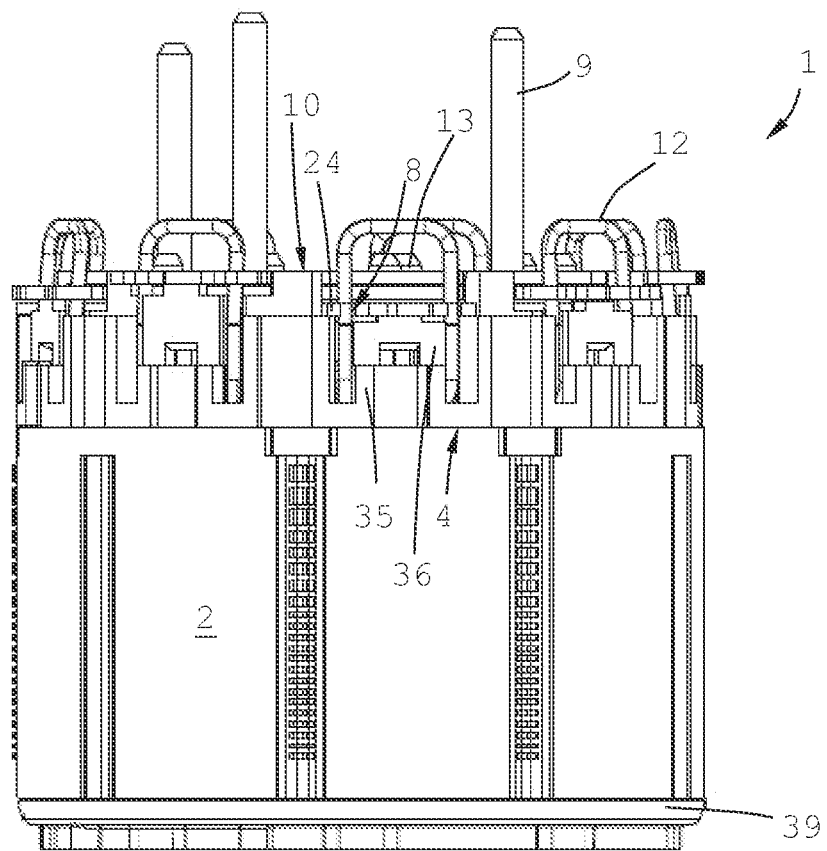
FIG. 10 is a side view of the stator after the forming operation with projecting arms removed.

FIG. 10 shows the stator 1 after a bending operation of the conductor loops 12. The conductor loops 12 are guided by a guide contour 35 in such a way that they each assume a defined position. The spacers 36 of the carrier unit 10 form an additional guide 27. The guide contours 35 and spacers 36 in each case correspond to each other and their side faces are extended by the part in contact with them. The guide contours 35 as well as the spacers 36 also serve as axial stops for the respective adjoining part. Finally, the side faces of the guide contours 35 and of the spacers 36 are extended by the winding-wire receptacle 8 of the interconnection unit 7. In this way, the conductor loops 12 can be easily inserted into the winding-wire receptacles 8 by bending the conductor loops 12 from an angled position into an axially parallel position. In this position, the conductor loops 12 are held in place and the contact fingers 24 are heated to the melting point by a laser beam. FIG. 10 also shows the stator core 2, the retaining pins 13 and the terminal 9, the insulating cap 24 and the end cap 39. The projecting arms 16 for receiving the conductor loops 12 have already been removed.

Figure 11:
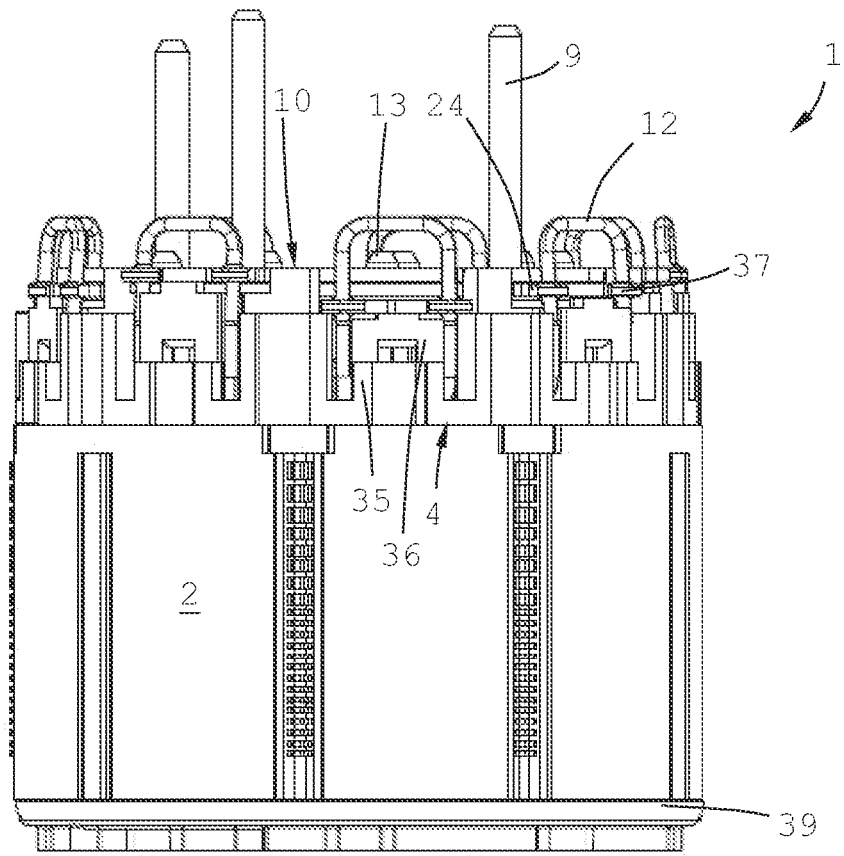
FIG. 11 is a side view of the stator after the welding operation with projecting arms removed.

FIG. 11 shows the result of this process. The portions of the contact fingers 24 projecting beyond the winding wire inserted in the winding-wire receptacle 8 (FIG. 6B) have been melted away. The melted material 37 now closes off the previously open winding-wire receptacle and has wrapped itself around the winding wire and forms a materially bonded connection therewith on the inside. The electrical connection produced can be used for applications with high electrical currents. FIG. 11 also shows the carrier means 10, the retaining pins 13, the guide contours 35, the spacers 36, the conductor loops 12, the terminal 9, the insulating cap 4 and the end cap 39.

Figure 12:
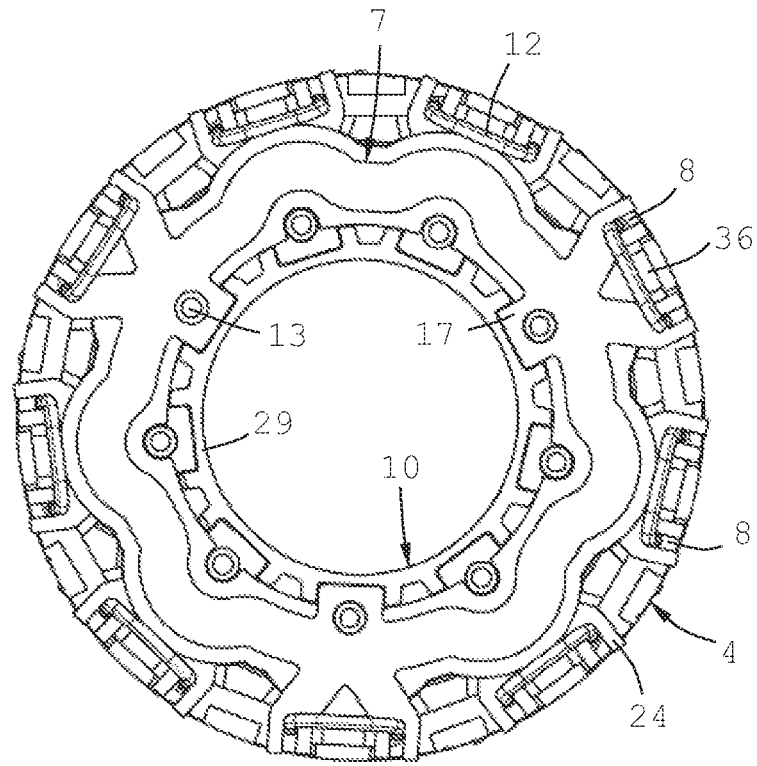
FIG. 12 is a plan view of FIG. 10.

FIG. 12 shows a top view of FIG. 10, with the carrier unit 10, the insulating cap 4, the interconnection unit 7, the retaining pins 13, the retaining tongues 17, the conductor loops 12, the winding-wire receptacles 8, the spacers 36, the stiffening ring 29 and the radially projecting contact fingers 24.

Figure 13:
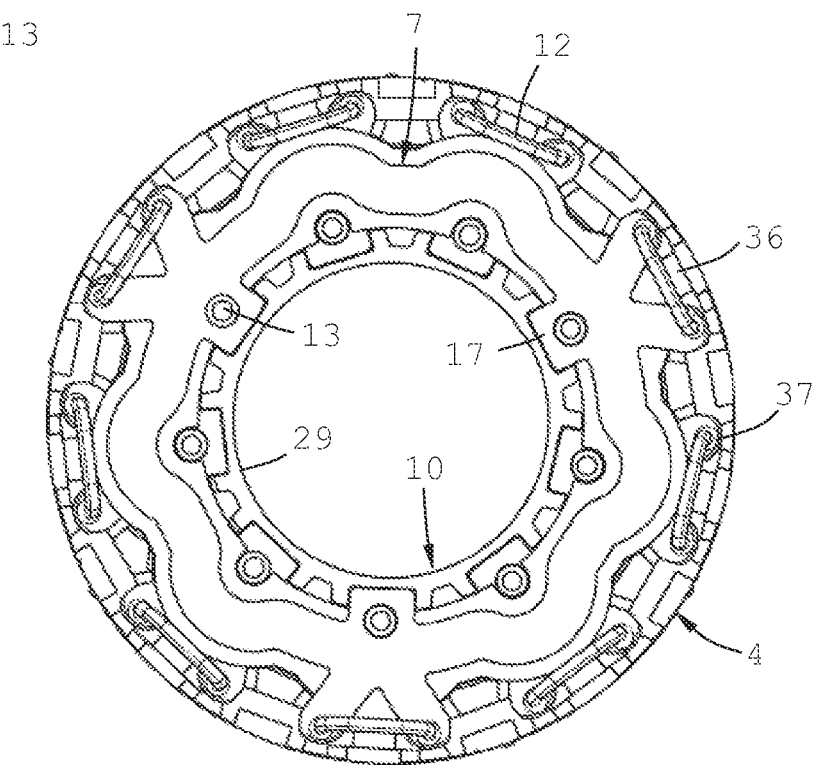
FIG. 13 is a plan view of FIG. 11.

FIG. 13 shows a top view of FIG. 11, with the carrier unit 10, the insulating cap 4, the interconnection unit 7, the retaining pins 13, the retaining tongues 17, the conductor loops 12, the spacers 36, the stiffening ring 29 and the melted material 37 that has wrapped itself around the winding wires.

Figure 14:
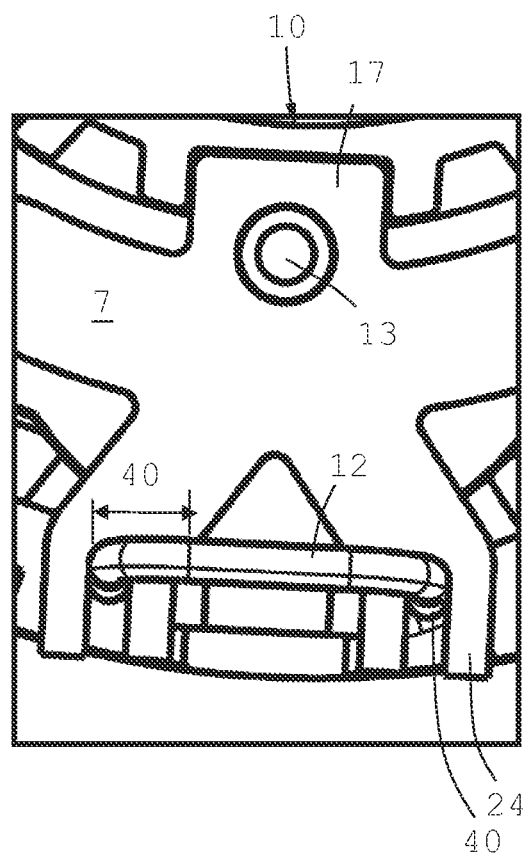
FIG. 14 is a detail view of a conductor loop before the welding operation.

FIG. 14 shows a detail view of a conductor loop 12 before the welding operation, with the carrier unit 10, the interconnection unit 7, a retaining pin 13, a retaining tongue 17 and winding-wire receptacles 8. In this state, winding wire regions 40 of conductor loop 12 are freed of an insulating varnish. The stripping was carried out with the aid of a laser beam. The retaining pin 13 is hot-reshaped to hold the interconnection unit 7. Also shown are contact fingers 24 which project significantly beyond the inserted winding wire of the conductor loop 12. As a result, sufficient material is present to wrap around the winding wire after being melted.

Figure 15:
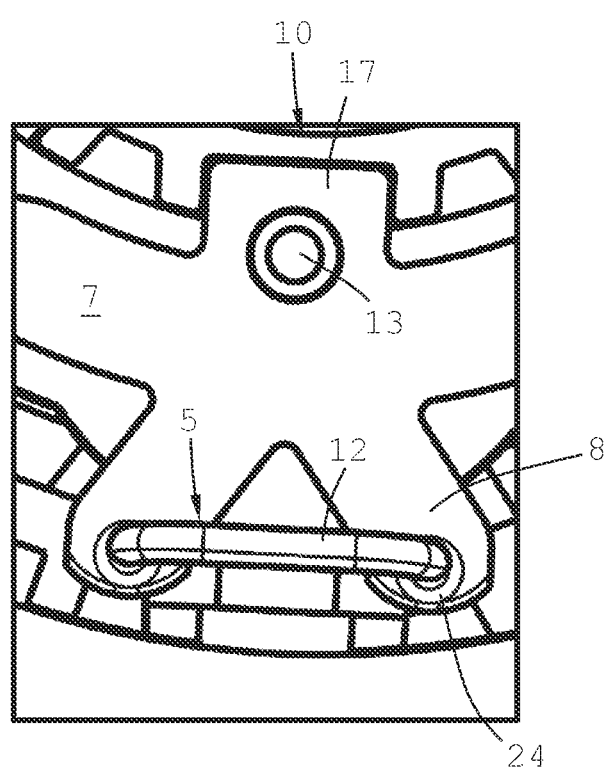
FIG. 15 is a detail view of the conductor loop after the welding operation.

FIG. 15 shows a detail view of the conductor loop 12 after the welding operation. The winding wire 5 and the interconnection unit 7 are made of copper and can therefore be welded optimally. A retaining pin 13 and a retaining tongue 17 are also shown. The conductor loop is then removed in order to save installation space in the axial direction; this can be done mechanically by shearing off or likewise by means of a laser beam. During the welding process, the laser beam is guided over both contact fingers 24 line by line, thereby also heating the winding wire 5 in a metered manner.

Figure 16:
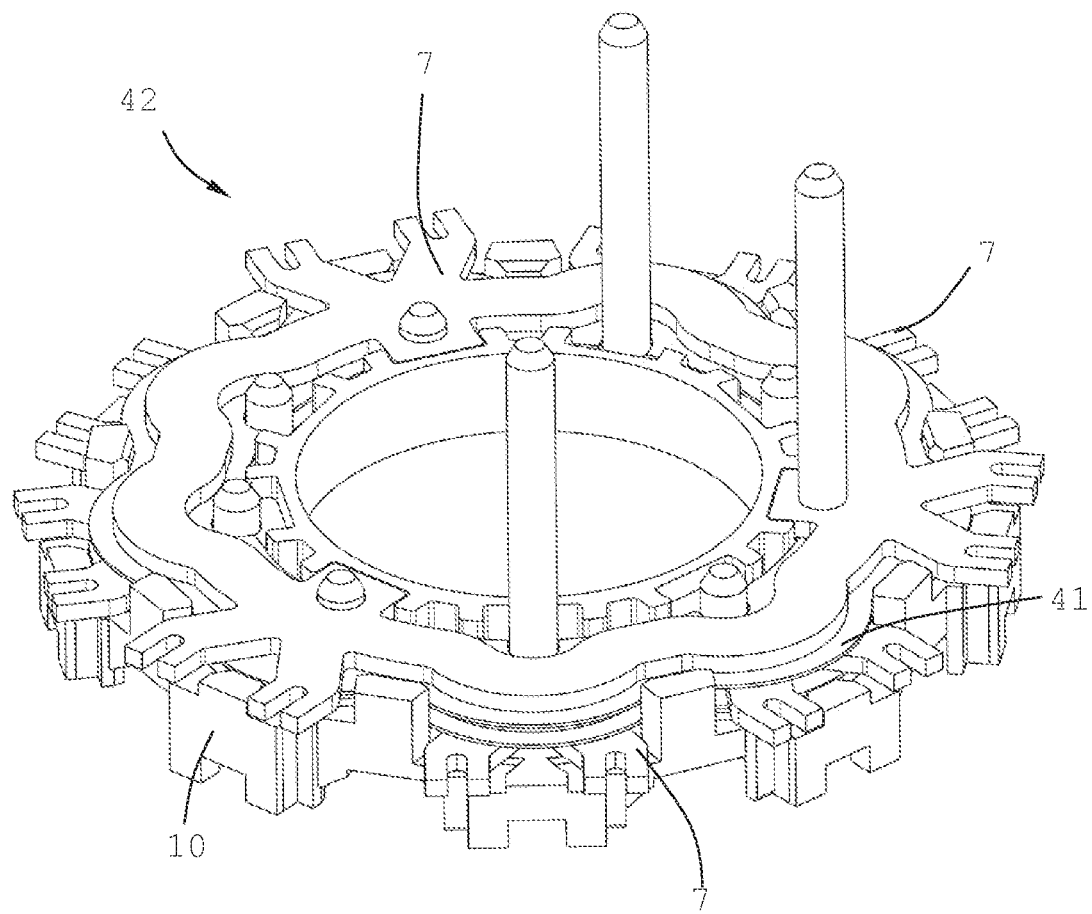
FIG. 16 shows in perspective view part of the plan view of FIG. 2.

FIG. 16 shows in perspective view part of the plan view of FIG. 2, FIG. 16 shows how insulating rings 41 and interconnecting units 7 are alternately stacked on top of each other. The interconnection units are stacked alternately with insulating rings 41 on the carrier unit 10. The carrier unit 10 and the plurality of interconnection units 7 with insulating rings 41 are pre-assembled to form a single assembly 42.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Stator
2 Stator core
3 Stator pole
4 Insulating cap
5 Winding wire
6 Stator winding
7 Interconnection unit
8 Winding-wire receptacle
9 Terminal
10 Carrier unit
11 End region
12 Conductor loop
13 Retaining pin
14 Hole
15 Indentation
16 Projecting arm
17 Retaining tongue
18 Starting peg
19 End peg
20 Cross-member
21 Recess
22 Winding start
23 Winding end
24 Contact finger
25 Clamping finger
26 Additional projecting arm
27 Guide
28 Central recess
29 Stiffening ring
30 Bus ring
31 Bulge
32 Receptacle
33 Radial recess
34 Axial recess
35 Guide contour
36 Spacer
37 Melted material
38 Bending edge
39 End cap
40 Winding wire region

What is claimed is:

1. A method for manufacturing a stator of an electric motor having a stator core with a plurality of salient stator poles, an insulating cap, a stator winding consisting of a winding wire, and an interconnection structure with a plurality of winding-wire receptacles, the method comprising the steps of:
   a) providing the stator core, the insulating cap, an end cap, the winding wire, a carrier unit and an interconnection unit or the interconnection structure with the carrier unit and the interconnection unit integrated together;
   b) mounting the insulating cap and the end cap on in each case an axial end region of the stator core;
   c) winding each of the plurality of salient stator poles of the stator core with the winding wire, wherein the winding wire is guided between two poles having a radial component beyond the diameter of the stator core and around a projecting arm and guided radially inwards angularly offset from a stator pole that is to be wound next while forming a conductor loop;
   d) stripping winding wire regions of the conductor loop while holding in position and maintaining free accessibility by the projecting arm;
   e) positionally mounting of the carrier unit and the interconnection unit or the interconnection structure with the carrier unit and interconnection unit integrated together, wherein the angular position of the winding-wire receptacles corresponds to the angular positions of the outwardly or inwardly running winding wire;

f) bending the conductor loop radially inwards with the aid of the carrier unit until the winding wire regions of the conductor loops engage in the winding-wire receptacle of the interconnection unit that is are bounded by contact fingers;

g) heating the contact fingers on both sides of the winding-wire receptacle before, after or during a cutting of the conductor loop by means of a laser beam until said contact fingers melt and the melted material internally connects with and welds to the winding wire;

h) removing one or more projecting arms either simultaneously or sequentially for temporarily supporting the conductor loop; and i) mounting further components or assemblies.

2. The method according to claim 1, wherein the conductor loop is held radially inside and touching the winding-wire receptacle during the welding operation.

3. The method according to claim 1, wherein insulating rings are additionally provided, wherein after the mounting of a first interconnection unit, insulating rings and further interconnection units are alternately stacked on top of each other.

4. The method according to claim 1, wherein the carrier unit and a plurality of interconnection units are pre-assembled to form a single assembly.

5. The method according to claim 4, wherein the carrier unit and the plurality of interconnection units are encapsulated by injection molding in order to form an assembly.

6. The method according to claim 4, characterized in that the plurality of interconnection units are encapsulated by injection molding and the carrier unit is formed in this way.

* * * * *